(12) United States Patent  
Gara et al.

(10) Patent No.: US 8,103,832 B2
(45) Date of Patent: Jan. 24, 2012

(54) METHOD AND APPARATUS OF PREFETCHING STREAMS OF VARYING PREFETCH DEPTH

(75) Inventors: Alan Gara, Mount Kisco, NY (US); Martin Ohmacht, Yorktown Heights, NY (US); Valentina Salapura, Chappaqua, NY (US); Krishnan Sugavanam, Mahopac, NY (US); Dirk Hoenicke, Seebruck-Seeon (DE)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/768,697

(22) Filed: Jun. 26, 2007

(65) Prior Publication Data

US 2009/0006762 A1    Jan. 1, 2009

(51) Int. Cl.
*G06F 13/00* (2006.01)
*G06F 13/28* (2006.01)

(52) U.S. Cl. ........ 711/137; 711/118; 711/154; 711/156; 711/E12.057

(58) Field of Classification Search .......... None
See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A | 8/1992 | Zook et al. | |
| 5,349,587 A | 9/1994 | Nadeau-Dostie et al. | |
| 5,353,412 A | 10/1994 | Douglas et al. | |
| 5,452,432 A | 9/1995 | Macachor | |
| 5,524,220 A | 6/1996 | Verma et al. | |
| 5,634,007 A | 5/1997 | Calta et al. | |
| 5,659,710 A | 8/1997 | Sherman et al. | |
| 5,708,779 A | 1/1998 | Graziano et al. | |
| 5,748,613 A | 5/1998 | Kilk et al. | |
| 5,761,464 A | 6/1998 | Hopkins | |
| 5,796,735 A | 8/1998 | Miller et al. | |
| 5,809,278 A | 9/1998 | Watanabe et al. | |
| 5,825,748 A | 10/1998 | Barleu et al. | |
| 5,890,211 A * | 3/1999 | Sokolov et al. | 711/113 |
| 5,917,828 A | 6/1999 | Thompson | |
| 5,958,040 A * | 9/1999 | Jouppi | 712/207 |
| 6,023,732 A | 2/2000 | Moh et al. | |
| 6,061,511 A | 5/2000 | Marantz et al. | |
| 6,072,781 A | 6/2000 | Feeney et al. | |
| 6,122,715 A | 9/2000 | Palanca et al. | |
| 6,185,214 B1 | 2/2001 | Schwartz et al. | |

(Continued)

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

(Continued)

*Primary Examiner* — Reginald Bragdon
*Assistant Examiner* — Eric S Cardwell
(74) *Attorney, Agent, or Firm* — Scully, Scott, Murphy & Presser, P.C.; Daniel P. Morris, Esq.

(57) ABSTRACT

Method and apparatus of prefetching streams of varying prefetch depth dynamically changes the depth of prefetching so that the number of multiple streams as well as the hit rate of a single stream are optimized. The method and apparatus in one aspect monitor a plurality of load requests from a processing unit for data in a prefetch buffer, determine an access pattern associated with the plurality of load requests and adjust a prefetch depth according to the access pattern.

20 Claims, 5 Drawing Sheets

U.S. PATENT DOCUMENTS

| | | | |
|---|---|---|---|
| 6,219,300 B1 | 4/2001 | Tamaki | |
| 6,263,397 B1 | 7/2001 | Wu et al. | |
| 6,295,571 B1 | 9/2001 | Scardamalia et al. | |
| 6,311,249 B1 | 10/2001 | Min et al. | |
| 6,324,495 B1 | 11/2001 | Steinman | |
| 6,356,106 B1 | 3/2002 | Greeff et al. | |
| 6,366,984 B1 | 4/2002 | Carmean et al. | |
| 6,442,162 B1 | 8/2002 | O'Neill et al. | |
| 6,466,227 B1 | 10/2002 | Pfister et al. | |
| 6,564,331 B1 | 5/2003 | Joshi | |
| 6,594,234 B1 | 7/2003 | Chard et al. | |
| 6,598,123 B1 | 7/2003 | Anderson et al. | |
| 6,601,144 B1 | 7/2003 | Arimilli et al. | |
| 6,631,447 B1 | 10/2003 | Morioka et al. | |
| 6,647,428 B1 | 11/2003 | Bannai et al. | |
| 6,662,305 B1 | 12/2003 | Salmon et al. | |
| 6,735,174 B1 | 5/2004 | Hefty et al. | |
| 6,775,693 B1 | 8/2004 | Adams | |
| 6,799,232 B1 | 9/2004 | Wang | |
| 6,874,054 B2 | 3/2005 | Clayton et al. | |
| 6,880,028 B2 | 4/2005 | Kurth | |
| 6,889,266 B1 | 5/2005 | Stadler | |
| 6,894,978 B1 | 5/2005 | Hashimoto | |
| 6,954,887 B2 | 10/2005 | Wang et al. | |
| 6,986,026 B2 | 1/2006 | Roth et al. | |
| 7,007,123 B2 | 2/2006 | Golla et al. | |
| 7,058,826 B2 | 6/2006 | Fung | |
| 7,065,594 B2 | 6/2006 | Ripy et al. | |
| 7,143,219 B1 | 11/2006 | Chaudhari et al. | |
| 7,191,373 B2 | 3/2007 | Wang et al. | |
| 7,239,565 B2 | 7/2007 | Liu | |
| 7,280,477 B2 | 10/2007 | Jeffries et al. | |
| 7,298,746 B1 | 11/2007 | De La Iglesia et al. | |
| 7,363,629 B2 | 4/2008 | Springer et al. | |
| 7,373,420 B1 | 5/2008 | Lyon | |
| 7,401,245 B2 | 7/2008 | Fischer et al. | |
| 7,454,640 B1 | 11/2008 | Wong | |
| 7,454,641 B2 | 11/2008 | Connor et al. | |
| 7,461,236 B1 | 12/2008 | Wentzlaff | |
| 7,463,529 B2 | 12/2008 | Matsubara | |
| 7,502,474 B2 | 3/2009 | Kaniz et al. | |
| 7,539,845 B1 | 5/2009 | Wentzlaff et al. | |
| 7,613,971 B2 | 11/2009 | Asaka | |
| 7,620,791 B1 | 11/2009 | Wentzlaff et al. | |
| 7,698,581 B2 | 4/2010 | Oh | |
| 2001/0055323 A1 | 12/2001 | Rowett et al. | |
| 2002/0078420 A1 | 6/2002 | Roth et al. | |
| 2002/0087801 A1 | 7/2002 | Bogin et al. | |
| 2002/0100020 A1 | 7/2002 | Hunter et al. | |
| 2002/0129086 A1 | 9/2002 | Garcia-Luna-Aceves et al. | |
| 2002/0138801 A1 | 9/2002 | Wang et al. | |
| 2002/0156979 A1 | 10/2002 | Rodriguez | |
| 2002/0184159 A1 | 12/2002 | Tadayon et al. | |
| 2003/0007457 A1 | 1/2003 | Farrell et al. | |
| 2003/0028749 A1 | 2/2003 | Ishikawa et al. | |
| 2003/0050714 A1 | 3/2003 | Tymchenko | |
| 2003/0050954 A1 | 3/2003 | Tayyar et al. | |
| 2003/0074616 A1 | 4/2003 | Dorsey | |
| 2003/0105799 A1 | 6/2003 | Khan et al. | |
| 2003/0163649 A1 | 8/2003 | Kapur et al. | |
| 2003/0177335 A1 | 9/2003 | Luick | |
| 2003/0188053 A1 | 10/2003 | Tsai | |
| 2003/0235202 A1 | 12/2003 | Van Der Zee et al. | |
| 2004/0003184 A1 | 1/2004 | Safranek et al. | |
| 2004/0019730 A1 | 1/2004 | Walker et al. | |
| 2004/0024925 A1 | 2/2004 | Cypher et al. | |
| 2004/0059873 A1* | 3/2004 | Hum et al. | 711/137 |
| 2004/0073780 A1 | 4/2004 | Roth et al. | |
| 2004/0103218 A1 | 5/2004 | Blumrich et al. | |
| 2004/0210694 A1 | 10/2004 | Shenderovich | |
| 2004/0243739 A1 | 12/2004 | Spencer | |
| 2005/0007986 A1 | 1/2005 | Malladi et al. | |
| 2005/0053057 A1 | 3/2005 | Deneroff et al. | |
| 2005/0076163 A1 | 4/2005 | Malalur | |
| 2005/0160238 A1 | 7/2005 | Steely et al. | |
| 2005/0216613 A1 | 9/2005 | Ganapathy et al. | |
| 2005/0251613 A1 | 11/2005 | Kissell | |
| 2005/0270886 A1 | 12/2005 | Takashima | |
| 2005/0273564 A1 | 12/2005 | Lakshmanamurthy et al. | |
| 2006/0050737 A1 | 3/2006 | Hsu | |
| 2006/0080513 A1 | 4/2006 | Beukema et al. | |
| 2006/0206635 A1 | 9/2006 | Alexander et al. | |
| 2006/0248367 A1 | 11/2006 | Fischer et al. | |
| 2007/0055832 A1 | 3/2007 | Beat | |
| 2007/0133536 A1 | 6/2007 | Kim et al. | |
| 2007/0168803 A1 | 7/2007 | Wang et al. | |
| 2007/0174529 A1 | 7/2007 | Rodriguez et al. | |
| 2007/0195774 A1 | 8/2007 | Sherman et al. | |
| 2008/0147987 A1 | 6/2008 | Cantin et al. | |

OTHER PUBLICATIONS

Almasi, et al., "Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

Definition of "mechanism", Oxford English Dictionary, http://dictionary.oed.com/entry/00304337?query_type=word&queryword=mechanism&first=1&max_to_show=10&sort_type=alpha&result_place=2&search_id=y2 atEIGc-11603 &hilite+00304337, Draft Revision Mar. 2010.

* cited by examiner

METHOD AND APPARATUS OF PREFETCHING STREAMS OF VARYING PREFETCH DEPTH

STATEMENT REGARDING FEDERALLY SPONSORED RESEARCH OR DEVELOPMENT

This invention was made with Government support under Contract. No. B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

FIELD OF THE INVENTION

The present disclosure generally relates to microprocessors and to multiprocessor architectures and, more particularly, to architectures with caches implementing prefetching.

BACKGROUND OF THE INVENTION

A prefetch unit is usually put between caches in different levels of hierarchy in order to alleviate the latency of access of the slower cache. A prefetcher identifies data streams and speculatively pre-fetches the next data line before requested by the processor. A prefetcher stores the data that it prefetched in a buffer whose size is a premium. This type of prefetching is useful only if future accesses can be predicted successfully.

A processor can continually request data from sequential addresses in which case the request pattern is said to be from a 'single' stream. On the other hand, if the request pattern of addresses from a processor is "Addr 'A', Addr 'B', Address 'A+1', Address 'B+1' ... " and so on then the request pattern is said to be from 'multiple' streams which in this case is 2, that is, from streams A and B.

A prefetcher, incorporated between an L1 and L2 cache, in response to an L1 cache line miss from the processor usually fetches 'b' bytes from the L2 cache. If 'x' bytes per cycle are used on an average by the processor and if the latency to fetch from the L2 cache is "k" cycles, then the prefetcher should have a depth of 'x' times 'k' bytes so that the processor would continually get hits in the prefetch buffer.

In a single stream request pattern, it is likely that the latency to get the data from the lower level memory exceeds the time needed by a processor to consume the data line. If a processor is fetching data belonging to a single data stream only, a prefetch engine which does not prefetch the required depth may not be able to keep up. Thus, the depth of prefetch should be high if the request pattern is from a singe stream. On the other hand, the depth of prefetch can be reduced if the requests are from multiple streams.

If a prefetcher does not distinguish between single and multiple streams and fetches the worst case prefetch depth required, then it would not be able to sustain as many streams as a prefetcher which adaptively chooses the prefetch depth. Therefore, what is desirable is a method and apparatus of prefetching streams of varying prefetch depth.

BRIEF SUMMARY OF THE INVENTION

Method, apparatus and system for prefetching streams of varying prefetch depth are provided. The method in one aspect may comprise monitoring a plurality of load requests from a processing unit for data in a prefetch buffer and determining an access pattern associated with the plurality of load requests, adjusting a prefetch depth according to the access pattern, and prefetching data of the prefetch depth to the prefetch buffer.

In another aspect a method of prefetching streams of varying prefetch depth may comprise receiving a load request from a processing unit, determining whether the load request follows a sequential access pattern of memory locations, for the load request that follows a sequential access pattern, increasing or maintaining a prefetch depth to have two or more additional cache lines adjacent to a cache line of the load request prefetched to a prefetch buffer, for the load request that does not follow a sequential access pattern, decreasing the prefetch depth if a previous load request was following a sequential access pattern, and prefetching data of the prefetch depth to the prefetch buffer.

An apparatus for prefetching streams of varying prefetch depth may comprise a prefetch buffer operable to store prefetched data, a mode control logic operable to monitor a plurality of load requests from a processing unit for data in the prefetch buffer and to determine an access mode associated with the plurality of load requests, and a prefetch engine operable to adjust a prefetch depth according to the access mode to prefetch data of the prefetch depth to the prefetch buffer.

A system for prefetching streams of varying prefetch depth may comprise means for storing prefetched data, means for monitoring a plurality of load requests from a processing unit for data in the prefetch buffer and to determining an access mode associated with the plurality of load requests, and means for adjusting a prefetch depth according to the access mode and prefetching data of the prefetch depth to the prefetch buffer.

Further features as well as the structure and operation of various embodiments are described in detail below with reference to the accompanying drawings. In the drawings, like reference numbers indicate identical or functionally similar elements.

DETAILED DESCRIPTION

Figure 1A:
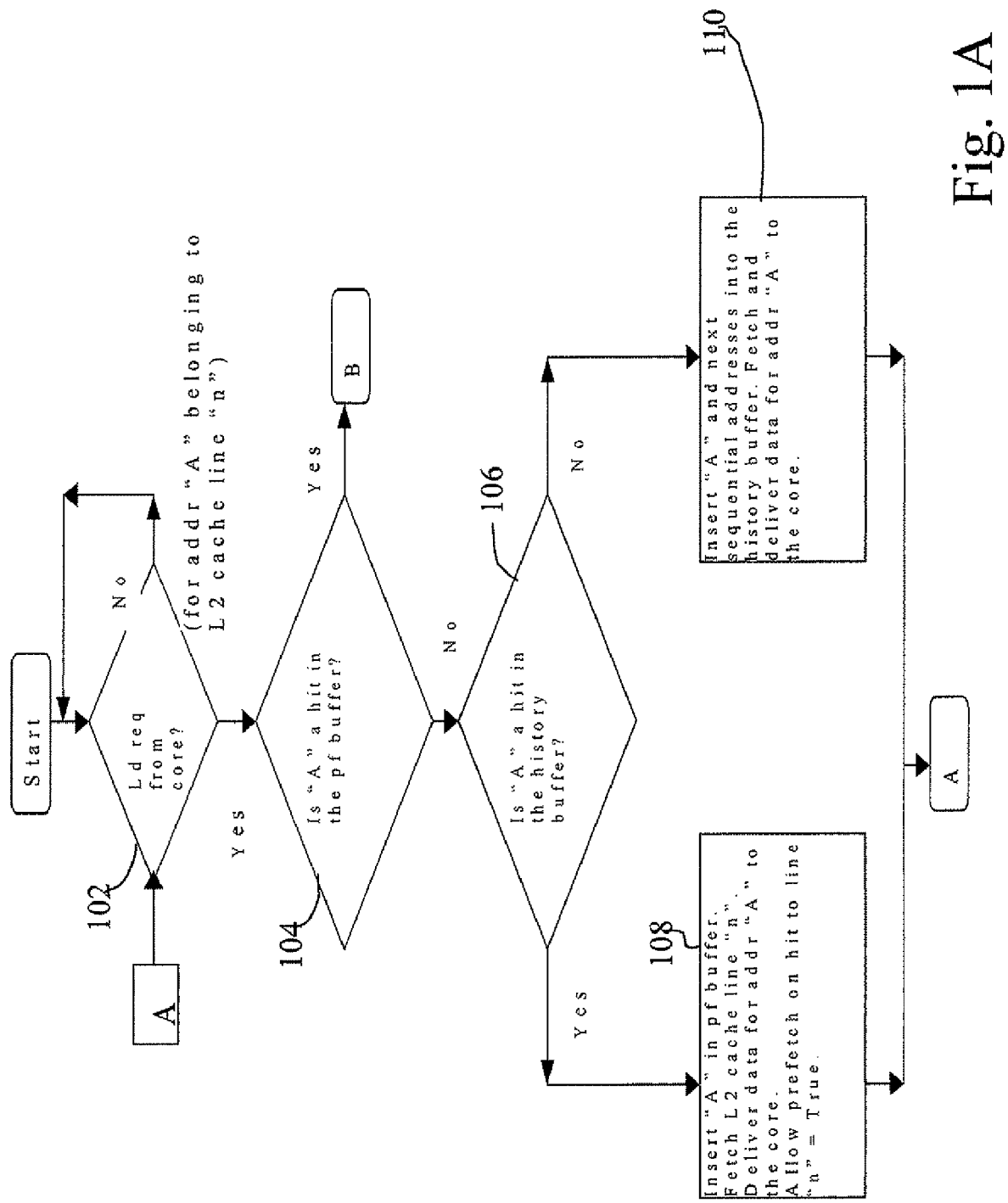
FIGS. 1A-1B illustrate a flow diagram that an adaptive prefetcher carries out in response to load misses from the core in one embodiment of the present disclosure.

The method and apparatus in one embodiment of the present disclosure adaptively chooses the prefetch depth. Briefly prefetch depth refers to amount or size of data that is prefetched from memory. Adaptively choosing the prefetch depth allows for sustaining the maximum number of multiple streams as well as getting high prefetch buffer hits and hiding the memory latency if the access pattern reverts to a single stream.

A prefetch algorithm of the present disclosure in one embodiment dynamically adapts its prefetch depth depending on the pattern of memory requests by a processor. Depending on the pattern of memory request, a prefetch engine determines the depth of prefetching it has to perform to provide data to the processor without stalling. Dynamic adaptation in one embodiment is accomplished by keeping track of memory request patterns and the information whether the prefetched data is used by the processor or not. Depending on the request pattern, the prefetch engine switches between multiple operation modes to prefetch one or more data lines ahead of time for optimal performance.

In one embodiment of the present disclosure, a buffer referred to as a history buffer is kept and used to store history of memory addresses a processor or core accessed and missed in the prefetch buffer. Requests from the processor initially miss in the prefetch buffer that is empty, and those missed addresses are stored in a history buffer in one embodiment of the present disclosure. Once a hit occurs in the history buffer, an active stream is identified and brought into the prefetch buffer. Subsequent hits on the prefetch buffer trigger a prefetch. A state machine continually tracks the requests from the core as well as the result of matching the request address against the entries present in the prefetch buffer and detects whether the stream is single or multiple. In case the access patterns reveal a single stream, the depth of prefetch is increased. If the access pattern changes to that of multiple streams, the depth of prefetch is decreased. This happens dynamically and may be completely transparent to the software.

In one embodiment described below, a prefetcher is assumed to exist between the L1 and the L2 caches. In this example, a prefetch always fetches an L2 cache line (which is a multiple of L1 cache line size). A request for address "A" belonging to L2 cache line "n", triggers a prefetch of the next sequential L2 cache line (henceforth called the "n+1 prefetch"). In case of single streams, the depth of prefetch is increased to two L2 lines (n+1 as well as n+2 prefetch).

It is understood to those skilled in the art that other embodiments are also possible without departing from the scope of this invention. In one embodiment, a prefetcher of the present disclosure may prefetch data from L2 cache and stores them in the prefetch buffers. In another embodiment, the prefetcher may prefetch data from L2 cache and stores them into L1 caches. In yet another embodiment, the prefetcher may prefetch data from the main memory and stores them in the L2 cache, or in the L1 cache, or in the prefetch buffers.

In one embodiment, a state machine continually tracks memory request to determine if single or multiple streams are requested, and increases or decreases the depth of prefetching. In another embodiment, the state machine tracks memory requests if single or multiple memory streams are requested, and switches between a prefetch algorithm associated with a single stream and a prefetch algorithm associated with multiple memory streams.

Figure 1B:
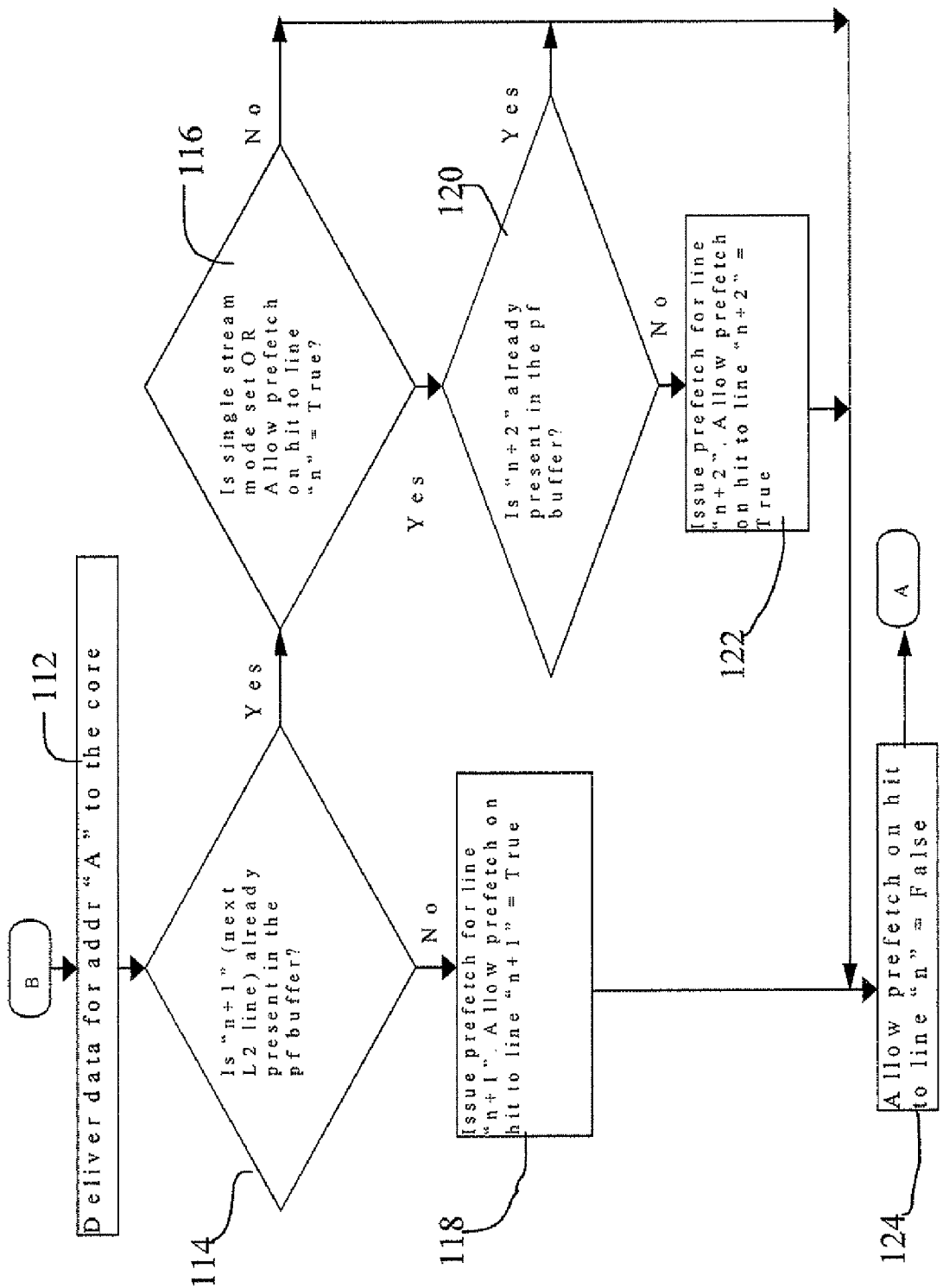

FIGS. 1A-1B illustrate an example of steps taken in the method in one embodiment for implementing adaptive prefetch depth of the present disclosure. A prefetcher may perform the steps shown in response to load requests from a core or a processor. It should be understood that the detailed steps shown in FIGS. 1A-1B are examples only and that any other implementation algorithm may be used to effect prefetching streams of varying prefetch depth of the present disclosure. At step 102, a prefetcher waits for a load miss from the core. A core, for example, includes functionalities of a processing unit. In this disclosure, a core, processor, processing core will be used interchangeably to refer to an entity or unit that requests data from memory. In this example, a miss from the core is typically a level 1 (L1) cache miss. If there are no load misses from the core, then the prefetcher continues to wait at step 102. At step 104, a load miss is presented to the prefetcher from the core. As an example, a load miss may be for address "A" belonging to the L2 cache line "n". The prefetcher checks whether this address is a hit in its prefetch buffers. If at step 104, the address is a hit in its prefetch buffer, that is, the prefetch buffer already contains this address (contents of this address), then address A is part of a previously recognized stream and the prefetcher proceeds to step 112. On the other hand, if the address is a miss in its prefetch buffer, that is, the prefetch buffer does not contain the address, then the method proceeds to step 106.

At step 106, address "A" is checked against a history of previous patterns of fetches. If there is a match, then the execution proceeds to step 108. Otherwise, execution proceeds to step 110. At step 108, address "A" is considered to be a part of a new stream. This address is inserted into the prefetch buffer and the L2 cache line "n" containing the data for address "A" is fetched. The data requested by the core is delivered. This line is marked so that if any future hit on this line occurs, then the next sequential L2 line ("n+1") would be prefetched. Marking, for example, may be done by setting a flag, allow prefetch on hit to line "n" to true. Execution returns to step 102 where the prefetcher waits for the next load miss from the core.

If, at step 106, address "A" was a miss in the history buffer, address "A" and the next sequential address "n+1" are inserted into the history buffer at step 110. This is done so that if further requests hit in the history buffer, this would become a new stream. The data for address "A" is fetched and delivered to the core. Execution returns to step 102.

Referring to FIG. 1B, at step 112, as there was a hit in the prefetch buffer, the requested data is delivered to the core and execution proceeds to step 114. At step 114, the prefetcher examines whether the next L2 cache line "n+1" is already present in the prefetch buffer or not. If the next L2 cache line "n+1" is not present, then execution proceeds to step 118. Otherwise execution proceeds to step 116.

At step 118, a prefetch for L2 cache line "n+1" is issued. This line is marked so that if any hit on this line occurs in the future, then the next sequential L2 line would be prefetched. Marking, for example, may be done by setting a flag, allow prefetch on hit to line "n+1" to true. Execution proceeds to step 124.

At step 116, the prefetcher examines whether any of the following conditions, a) single_stream_mode or b) allow prefetch for the next sequential L2 cache line is true. Setting of single stream mode condition is explained further below. If at least one of the conditions is true, then execution proceeds to step 120. Otherwise execution proceeds to step 124.

At step 120, the prefetcher checks whether L2 cache line "n+2" is already present in the prefetch buffer. If yes, then execution proceeds to step 124. Otherwise, execution proceeds to step 122. At step 122, a prefetch for L2 cache line "n+2" is issued. This line is marked so that if any hit on this line occurs in the future, then the next sequential L2 line would be prefetched. Marking, for example, may be done by setting a flag, allow prefetch on hit to line "n+2" to true. Execution proceeds to step 124. At step 124, the condition which allowed prefetch of line "n+1" on hit to line "n" is reset. Execution now returns to step 102.

The above-described method detects whether the memory requests from a core have single or multiple stream patterns. In the case of single stream pattern, the method prefetches at least two more cache lines following the requested cache line.

If it is determined that the data requests do not follow a single stream pattern, the method prefetches a cache line following the requested cache line. Prefetch depth is thus adaptive to the type of stream pattern associated with the memory requests from the core and is dynamically adjusted, increased or decreased, based on the type or nature of the memory request.

Figure 2:
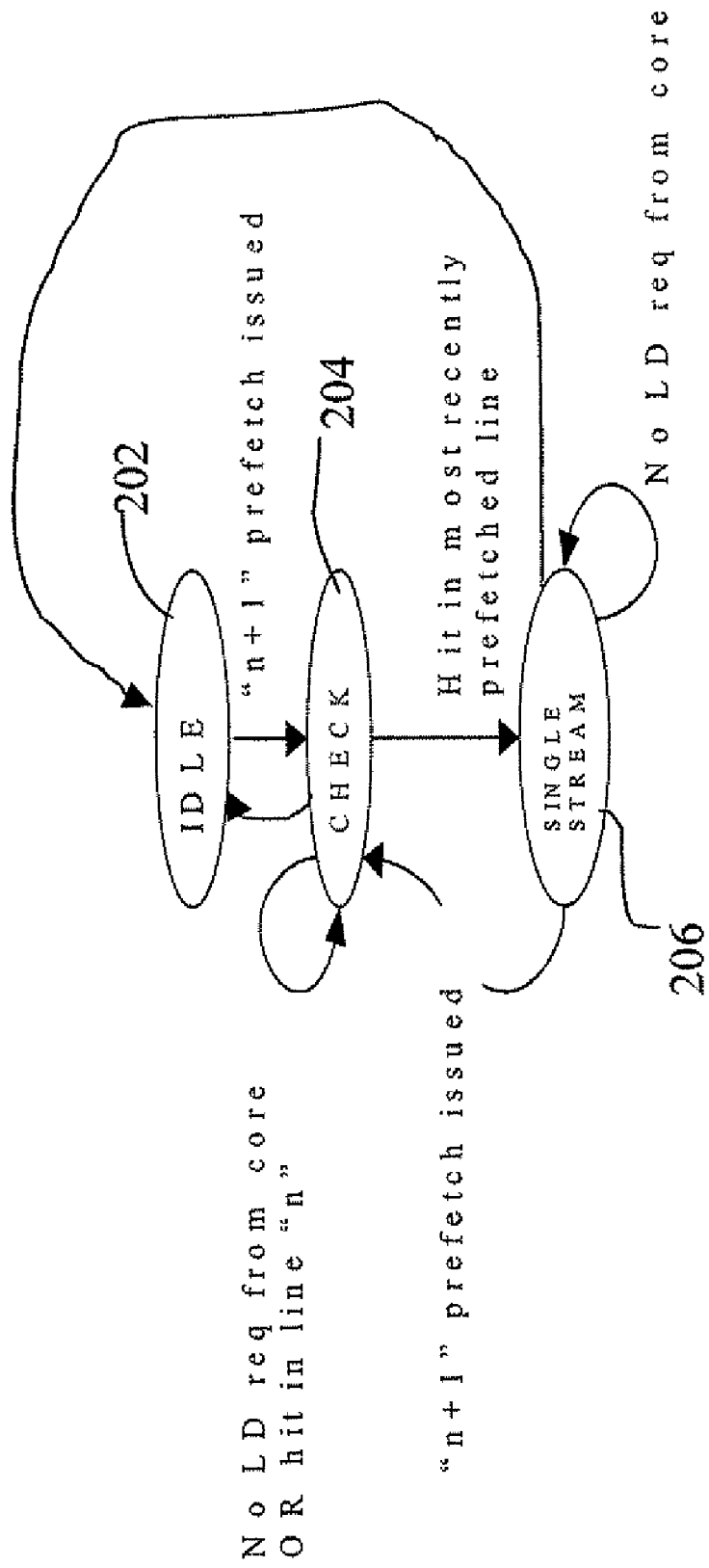
FIG. 2 shows a method in one embodiment that a prefetcher uses to detect a single stream in order to initiate an increase in the prefetch depth.

FIG. 2 illustrates a state machine diagram used to detect the single stream and to set or reset the single_stream_mode bit in one embodiment of the present disclosure. A state machine is initially in the IDLE state 202. It transitions to the CHECK state 204 if a prefetch was issued to line "n+1". A prefetch is issued to line "n+1", if there is a hit on line n. Otherwise it remains in the IDLE state 202.

Once in the CHECK state 204, if hits occur to line "n" or if there were no load requests from the core, then the state machine remains in the CHECK state 204. If a load request occurs for the latest prefetched line, that is, line "n+1", then the state machine determines that it is a single stream and transitions to the SINGLE STREAM state 206. If the load request is not to the latest prefetched line, then the state machine transitions back to the IDLE state.

In the SINGLE STREAM state 206, the single_stream_mode bit is set. Recall that in single stream mode, two additional lines are prefetched, thus, two additional lines after "n" line are prefetched. If no load requests occur, then the state machine remains in the SINGLE STREAM state 206. If a "n+1" prefetch occurs, then a change to a different stream has occurred and hence the state machine moves to the CHECK state 204 and the single_stream_mode bit is reset. Otherwise, on the next load request, the state machine transitions back to the IDLE state.

It should be noted that setting of single_stream_mode bit triggers the "n+2" prefetch. A flag associated with each line, that specifies to allow prefetch to the next sequential cache line would be reset after a hit on that line occurs, and after prefetching a next sequential cache line if applicable, for example, if a single_stream_mode bit is set or a flag to allow prefetch to the next sequential cache line is set. On a hit on line "n+1", the presence of line "n+2" without resetting of the flag associated with line "n+1" that specifies to allow prefetch to next sequential cache line sustains the prefetching of cache lines of depth 2. Thus, for example, if there is a hit on line "n+1", and line "n+2" was already fetched, but the flag associated with line "n+1" was not reset, the next line, "n+3" would be prefetched. Table 1 illustrates an example load request pattern, actions taken and transitioning of the state diagram. In Table 1, when a line is fetched, a flag that is associated with that line, and that specifies to allow prefetch to the next sequential cache line is set.

TABLE 1

| Load request | Action | State |
| --- | --- | --- |
| Hit on line 0 | fetch line 1<br>set flag for line 1<br>reset flag for line 0 | check |
| Hit on line 1 | fetch line 2<br>set flag for line 2<br>reset flag for line 1 | single stream |
| Hit on line 1 | fetch line 3<br>set flag for line 3<br>reset flag for line 1 | idle |
| Hit on line 2 | fetch line 4<br>set flag for line 4<br>reset flag for line 2 | idle |
| Hit on line 3 | fetch line 5<br>set flag for line 5<br>reset flag for line 3 | idle |

The state machine of FIG. 2 is shown as one example of a method for keeping track of single and multiple stream modes and how deep the prefetch depth should be set or adjusted at a given time. It should be understood that any other methodology may be used to determine the status of single and multiple stream modes and the method and system of the present disclosure is not limited to only those described or illustrated as examples herein.

Figure 3:
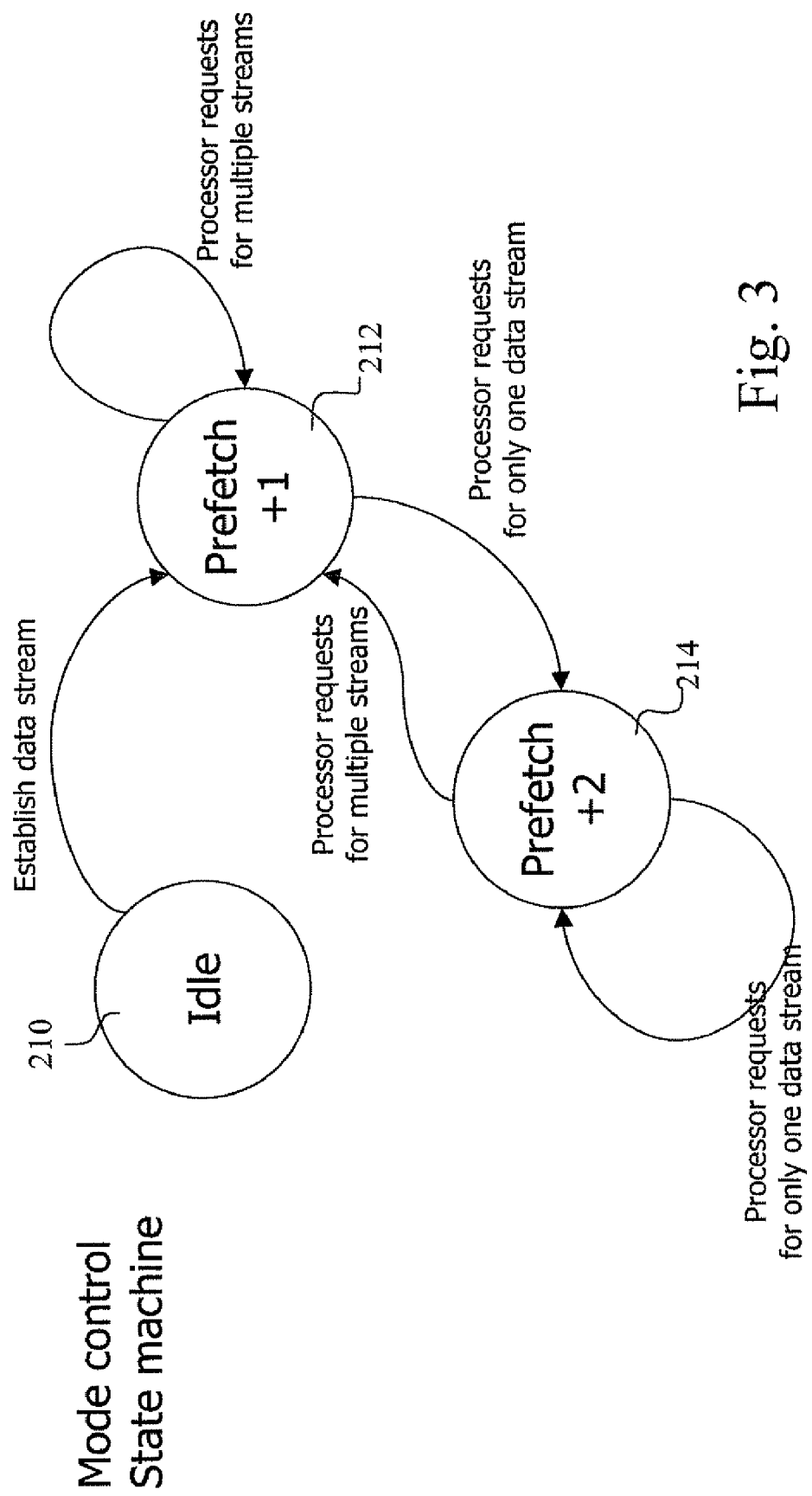
FIG. 3 shows another view of a state machine for detecting different stream modes or patterns of memory requests from a core or a processor.

FIG. 3 shows another view of a state machine for detecting different stream modes or patterns of memory requests from a core or a processor. At 210, the state machine is in idle state, and transitions to prefetch+1 state 212 when data is prefetched into a prefetch buffer. The state machine remains in this state 212 while requests from a core or a processor are from multiple streams. The state machine moves to prefetch+2 state 214 when it is detected that there is a single stream pattern in the memory requests. The state machine stays in the prefetch+2 state 214 while the processor requests for only one data stream. When it is detected that the processor requests multiple streams, the state machine transitions to prefetch+1 state 212. In another embodiment, mode control can have more states for deeper prefetching, for example, Idle, +1, +2, +3, +4, etc.

The modes of operation (e.g., prefetch+1, prefetch+2, etc.) dynamically change depending on memory access pattern, and in another embodiment, according to hits in the prefetch buffer. In yet another embodiment, processor can issue a "hint" to prefetch engine to change the mode of prefetching. "Hint" can be implemented by adding a control register mapped to memory address space, and processor has write access to this control register. Prefetch mode may be determined by command written to that register.

In yet another embodiment, prefetch engine can access bidirectional streams, for accessing ascending and descending streams. For instance, mode control state machine may have states: Idle, +1, +2, −1, −2. Dynamic switching between the states, and prefetching one or more data lines for ascending or descending streams may be implemented. The transitions to the −1 and −2 states are similar to the transitions to the +1 and +2 states except that the stream follows a descending pattern (Addr "A", Addr "A−1", Addr "A−2" . . . and so on).

Figure 4:
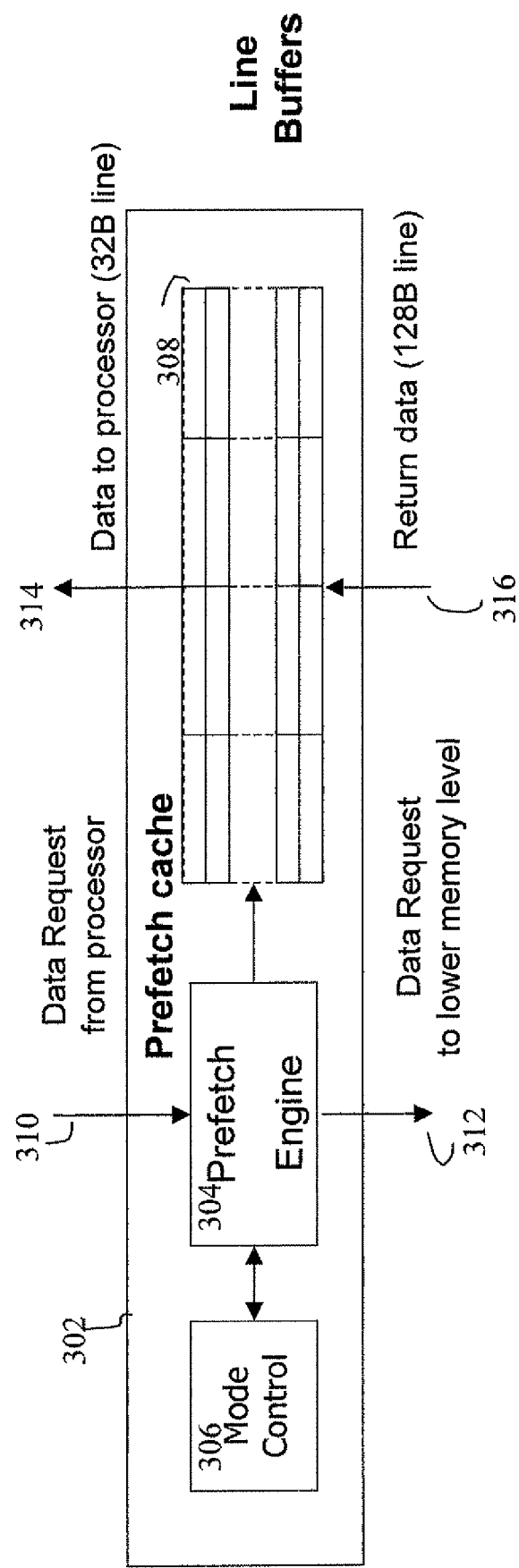
FIG. 4 is a diagram illustrating an overview of a prefetcher between L1 and L2 cache in one embodiment of the present disclosure.

FIG. 4 is a diagram illustrating an overview of a prefetcher between L1 and L2 cache in one embodiment of the present disclosure. Data prefetch cache 302 may include line buffers 308, a prefetch engine 304 and a mode control 306. Line buffer 308 holds prefetched data. Every prefetch brings a cache line such as a DRAM-based cache line into the line buffer 308. In this example, each cache line is a multiple of L1 lines. Prefetch engine 304 generates prefetch requests and manages line buffer replacement. On a miss in prefetch cache, next fetch is issued. On a hit in prefetch cache, data is transmitted to the processor Mode control determines the depth of prefetching for prefetch engine. For example, when a data request is issued from a processor at 310, prefetch engine 304 determines whether the requested data is in the line buffers 308. If the requested data is in the line buffers 308, the data is sent to the processor as shown at 314. If the requested data is not found in the line buffers 308, prefetch engine 304 requests the data from the next lower memory level, for example, L2, as shown at 312. Prefetch engine 304 receives the data from the next level memory as shown at 316, store the data in the line buffers 308, and also sends the data to the requesting processor as shown at 314.

Prefetch engine 304 keeps track of memory requests issued by a processor It determines whether a prefetch request for the next data line from lower memory level should be issued or not. Mode control 306 keeps track of whether a processor is accessing a single data stream or multiple data streams, for instance, by means of a state machine shown in FIGS. 2 and 3. Any other method may be used to determine the modes. When it is detected that only a single data stream is being accessed, for instance, by looking at several consecutive data requests, mode control engine 306 signals this condition to the prefetch engine to switch depth of prefetching. For instance, if multiple data streams are accessed, mode control 306 may signal the prefetch engine 304 to prefetch only 1 data line. If one data stream is used, mode control 306 may signal the prefetch engine 304 to prefetch 2 data lines or more. In one embodiment, mode control 306 determines prefetch mode dynamically, for instance, by observing memory accesses from the processor.

The components shown in the prefetch cache 302, for instance, mode control 306, prefetch engine 304, line buffers 308 may be implemented using registers, circuit and hardware logic elements.

While the above examples showed the prefetch unit between L1 and L2 caches, it should be understood that the method and apparatus of the present disclosure may be applied and/or used in prefetching data from any levels of memory hierarchy. For example, the system and method of the present disclosure may apply to fetching data between L3 and L2 caches, L3 cache and other memory subsystems, or between any other levels of memory hierarchy.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of prefetching streams of varying prefetch depth, comprising:

monitoring a plurality of load requests from a processing unit for data in a prefetch buffer and determining an access pattern associated with the plurality of load requests;

adjusting a prefetch depth according to the access pattern; and prefetching data of prefetch depth to the prefetch buffer;

wherein in response to an occurrence of a load miss on requested data contained in cache line n, determining whether the cache line n exists in the prefetch buffer, and if the cache line n exists in the prefetch buffer, fetching next cache line n+1 into the prefetch buffer and setting a prefetch on hit flag associated with the cache line n+1 to true if the next cache line n+1 does not exist in the prefetch buffer, and if the cache line n does not exist in the prefetch buffer, checking a history buffer for an address associated with the cache line n and if the history buffer contains the address associated with the cache line n, fetching the cache line n into the prefetch buffer and setting a prefetch on hit flag associated with the cache line n to true, and if the history buffer does not contain the address associated with the cache line n, inserting the address associated with the cache line n and an address associated with the cache line n+1 into the history buffer, and if the next cache line n+1 exists in the prefetch buffer, determining whether the access pattern is single memory stream access pattern or whether the prefetch on hit flag associated with the cache line n+1 is set to true and if the access pattern is single memory access pattern or the prefetch on hit flag associated with the cache line n+1 is set to true or both, fetching cache line n+2 into the prefetch buffer if the cache line n+2 is not in the prefetch buffer, and setting a prefetch on hit flag associated with the cache line n+2 to true, and resetting the prefetch on hit flag associated with the cache line n to false; and if the access pattern is not single memory access pattern and the prefetch on hit flag associated with the cache line n+1 is not set to true, resetting the prefetch on hit flag associated with the cache line n to false.

2. The method of claim 1, wherein the step of monitoring is performed using a state machine that transitions among a plurality of states based on the plurality of load requests from the processing unit, wherein the plurality of states includes at least an idle state in which a control of a prefetcher waits for a load miss to occur, a check state to which the control transitions if a prefetch was issued to the cache line n+1, and in which the control stays if one or more hits occur to the cache line n or no additional load requests, and a single stream state, to which the control transitions if a load request for latest prefetched line occurs.

3. The method of claim 1, wherein the prefetch depth is adjusted so that the prefetch depth when the plurality of load requests follow a sequential access pattern is greater than the prefetch depth when the plurality of load requests do not follow a sequential access pattern.

4. The method of claim 1, wherein the prefetch depth is at least a data size that can be processed by the processing unit per cycle multiplied by a number of cycles it takes to prefetch data into the prefetch buffer, when the plurality of load requests follow a sequential access pattern.

5. The method of claim 1, wherein the step of adjusting includes:
increasing the prefetch depth when the plurality of load requests follow a sequential access pattern; and
decreasing the prefetch depth when the plurality of load requests do not follow a sequential access pattern.

6. The method of claim 1, wherein the step of adjusting includes:
increasing the prefetch depth to at least one more cache line than previous prefetch depth when the plurality of load requests follow a sequential access pattern.

7. The method of claim 1, wherein the load requests from the processing unit are triggered when there is a miss in a first level of cache memory, and wherein data of prefetch depth is prefetched from a second level of cache memory to the prefetch buffer.

8. The method of claim 1, wherein the steps are performed dynamically as each load request is received from the processing unit.

9. The method of claim 1, wherein the step of monitoring includes receiving a signal from the processing unit to determine an access pattern associated with the plurality of load requests.

10. A method of prefetching streams of varying prefetch depth, comprising:
receiving a load request from a processing unit;
determining whether the load request follows a sequential access pattern of memory locations;
for the load request that follows a sequential access pattern, increasing or maintaining a prefetch depth to have at least two additional cache lines adjacent to a cache line associated with the load request prefetched to a prefetch buffer;
for the load request that does not follow a sequential access pattern, decreasing the prefetch depth if a previous load request was following a sequential access pattern; and
prefetching data of the prefetch depth to the prefetch buffer, wherein in response to an occurrence of a load miss on requested data contained in cache line n, determining whether the cache line n exists in the prefetch buffer, and if the cache line n exists in the prefetch buffer, fetching next cache line n+1 into the prefetch buffer and setting a prefetch on hit flag associated with the cache line n+1 to true if the next cache line n+1 does not exist in the prefetch buffer, and if the cache line n does not exist in the prefetch buffer, checking a history buffer for an address associated with the cache line n and if the history buffer contains the address associated with the cache line n, fetching the cache line n into the prefetch buffer and setting a prefetch on hit flag associated with the cache line n to true, and if the history buffer does not contain the address associated with the cache line n, inserting the address associated with the cache line n and an address associated with the cache line n+1 into the history buffer, and if the next cache line n+1 exists in the prefetch buffer, determining whether the access pattern is single memory stream access pattern or whether the prefetch on hit flag associated with the cache line n+1 is set to true and if the access pattern is single memory access pattern or the prefetch on hit flag associated with the cache line n+1 is set to true or both, fetching cache line n+2 into the prefetch buffer if the cache line n+2 is not in the prefetch buffer, and setting a prefetch on hit flag associated with the cache line n+2 to true, and resetting the prefetch on hit flag associated with the cache line n to false.

11. The method of claim 10, further including:
returning data associated with the load request to the processing unit.

12. The method of claim 10, wherein the step of determining is performed using a state machine that transitions among different states based on the received load request from the processing unit.

13. The method of claim 10, wherein the step of determining is performed using a hint from the processing unit.

14. The method of claim 10, wherein the steps are performed dynamically as each load request is received from the processing unit.

15. An apparatus for prefetching streams of varying prefetch depth, comprising:
a prefetch buffer operable to store prefetched data;
a mode control logic operable to monitor a plurality of load requests from a processing unit for data in the prefetch buffer and to determine an access mode associated with the plurality of load requests; and
a prefetch engine operable to adjust a prefetch depth according to the access mode to prefetch data of prefetch depth to the prefetch buffer, wherein in response to an occurrence of a load miss on requested data contained in cache line n, determining whether the cache line n exists in the prefetch buffer, and if the cache line n exists in the prefetch buffer, fetching next cache line n+1 into the prefetch buffer and setting a prefetch on hit flag associated with the cache line n+1 to true if the next cache line n+1 does not exist in the prefetch buffer, and if the cache line n does not exist in the prefetch buffer, checking a history buffer for an address associated with the cache line n and if the history buffer contains the address associated with the cache line n, fetching the cache line n into the prefetch buffer and setting a prefetch on hit flag associated with the cache line n to true, and if the history buffer does not contain the address associated with the cache line n, inserting the address associated with the cache line n and an address associated with the cache line n+1 into the history buffer, and if the next cache line n+1 exists in the prefetch buffer, determining whether the access pattern is single memory stream access pattern or whether the prefetch on hit flag associated with the cache line n+1 is set to true and if the access pattern is single memory access pattern or the prefetch on hit flag associated with the cache line n+1 is set to true or both, fetching cache line n+2 into the prefetch buffer if the cache line n+2 is not in the prefetch buffer, and setting a prefetch on hit flag associated with the cache line n+2 to true, and resetting the prefetch on hit flag associated with the cache line n to false; and if the access pattern is not single memory access pattern and the prefetch on hit flag associated with the cache line n+1 is not set to true, resetting the prefetch on hit flag associated with the cache line n to false.

16. The apparatus of claim 15, wherein the mode control logic includes a state machine for determining the access mode based on the plurality of load requests.

17. The apparatus of claim 15, further including:
registers for storing signals from the processing unit, wherein the mode control logic determines an access mode based on the signals in the registers.

18. The apparatus of claim 15, wherein the prefetch engine adjusts a prefetch depth so that for the access mode that is determined to have a single sequential memory access pattern, the prefetch depth is increased.

19. The apparatus of claim 15, wherein said apparatus is a prefetch cache operating between two levels of cache memory in a hierarchical cache memory structure.

20. A system for prefetching streams of varying prefetch depth, comprising:
means for storing prefetched data;
means for monitoring a plurality of load requests from a processing unit for data in the prefetch buffer and determining an access mode associated with the plurality of load requests; and
means for adjusting a prefetch depth according to the access mode and prefetching data of prefetch depth to the prefetch buffer,
wherein in response to an occurrence of a load miss on requested data contained in cache line n, determining whether the cache line n exists in the prefetch buffer,
and if the cache line n exists in the prefetch buffer, fetching next cache line n+1 into the prefetch buffer and setting a prefetch on hit flag associated with the cache line n+1 to true if the next cache line n+1 does not exist in the prefetch buffer,
and if the cache line n does not exist in the prefetch buffer, checking a history buffer for an address associated with the cache line n and if the history buffer contains the address associated with the cache line n, fetching the cache line n into the prefetch buffer and setting a prefetch on hit flag associated with the cache line n to true, and if the history buffer does not contain the address associated with the cache line n, inserting the address associated with the cache line n and an address associated with the cache line n+1 into the history buffer,
and if the next cache line n+1 exists in the prefetch buffer, determining whether the access pattern is single memory stream access pattern or whether the prefetch on hit flag associated with the cache line n+1 is set to true and if the access pattern is single memory access pattern or the prefetch on hit flag associated with the cache line n+1 is set to true or both, fetching cache line n+2 into the prefetch buffer if the cache line n+2 is not in the prefetch buffer, and setting a prefetch on hit flag associated with the cache line n+2 to true, and resetting the prefetch on hit flag associated with the cache line n to false; and if the access pattern is not single memory access pattern and the prefetch on hit flag associated with the cache line n+1 is not set to true, resetting the prefetch on hit flag associated with the cache line n to false.

* * * * *